INVENTOR
KATSUJI FUJIWARA 3,266,726
THERMO-SYNCHRONOUS STEAM TRAP
Katsuji Fujiwara, 191 Nishitani, Hiraoka-cho,
Kakogawa-shi, Hyogo-ken, Japan
Filed Sept. 25, 1963, Ser. No. 311,567
Claims priority, application Japan, Sept. 28, 1962,
37/42,382; Sept. 28, 1962, 37/42,383
6 Claims. (Cl. 236—56)

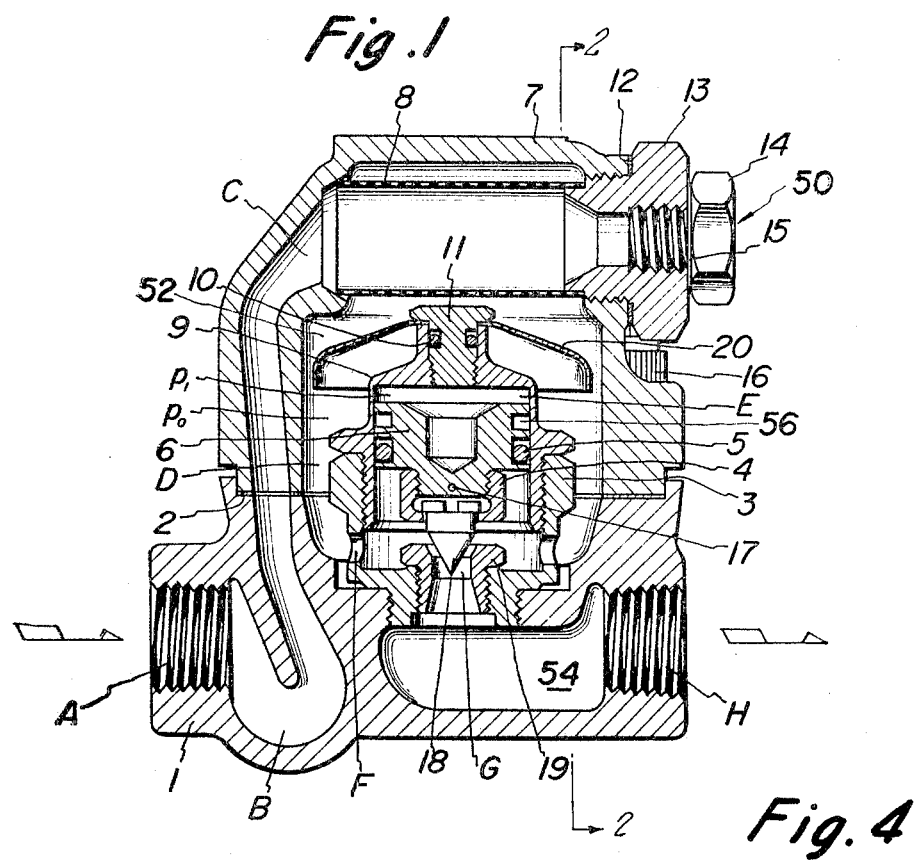
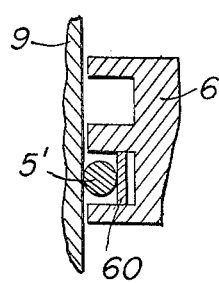
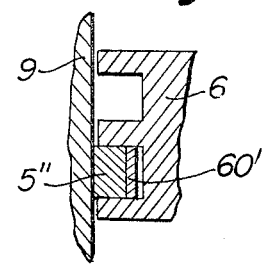
INVENTOR
KATSUJI FUJIWARA

This invention relates in general to vapor trap construction, and in particular to a new and useful steam trap having a pressure chamber for a control fluid for opening and closing the discharge of the trap, wherein the pressure chamber is charged with a fluid of substantially the same characteristics as the fluid being handled by the trap.

With conventional steam traps of a type which include pressure chambers for containing a fluid for actuating a movable member such as a bellows, diaphragm or piston, it is usual to employ an evaporative liquid such as alcohol, ether or the like which is sealed within the pressure chamber. Such a liquid forms a thermo-sensitive control medium for moving the actuation member to open and close the trap in accordance with the evaporation and condensation of such medium. Such evaporation is caused by the temperature variations of the vapor and condensate of the fluid being directed through the trap around the pressure chamber. Traps of this type utilize the movement of the control member by evaporation and condensation of the control medium to open and close the trap discharge.

Traps of the conventional character have the following disadvantages:

(1) Since the evaporation pressure of the liquid within the pressure chamber is considerably higher than the vapor pressure outside of this chamber, the degree of drop of its saturation temperature is very large when it drops to a pressure lower than that of the vapor pressure surrounding the chamber. To achieve this, it is necessary that the temperature of the condensate surrounding the chamber must drop to a considerably low temperature. Thus, traps of this character are not too sensitive. For instance, when alcohol is employed in the bellows, the saturation temperature for 3 atmospheres (gauge) is about 240° F. At this moment, the saturation temperature of the water vapor outside the bellows is around 290° F. for 3 atmospheres (gauge). Therefore, the temperature of the condensate must drop as low as 50° F. (from 290° F. to 240° F.) in order to make the pressure equal within the pressure chamber and surrounding the pressure chamber. A temperature difference of as much as 50° F. will make the trap insensitive and cause the condensate to stagnate for a long time in any machinery and tools which employ steam, and hence adversely affecting the functioning of such machinery.

(2) Liquid having a low boiling point, particularly alcohol, ether and the like, will easily evaporate in open air and when poured into the pressure chamber, will be liable to be scattered and lost. Thus, it is difficult to fill the chambers to the exact fixed quantity and the assembling operation will become more difficult in order to provide the necessary sealing.

(3) When high temperature steam flows into the trap, the movement of the bellows will be limited due to the rise of saturation pressure of the liquid within the bellows, making the use of a trap impossible, so that the range of the working pressure is strictly limited and the trap is not effective for use for superheated steam. For instance, water vapor has a saturation pressure of about 15 atmospheres (gauge) for a saturation temperature of 390° F. In the case of alcohol, the saturation pressure is about 27 atmospheres (gauge) for the saturation temperature of 390° F. Therefore, the pressure within the pressure chamber becomes about 12 atmospheres higher.

(4) During the use of the prior art traps, there acts a pressure difference which is normally higher within the pressure than outside, which pressure difference will have adverse effects on the diaphragm or bellows-type of control member and tends to cause a permanent set thereof.

In accordance with the present invention, there is provided a steam trap which includes means defining a pressure chamber for a control fluid with a member movable upon expansion of the fluid within the chamber during evaporation and contraction of the fluid during condensation, and characterized by the fact that the pressure chamber is filled with a fluid which is substantially similar to the fluid which is directed through the trap.

In a preferred arrangement according to the invention, there is provided a steam trap which includes an interior cylinder or tubular member defining a pressure chamber which is closed at one end by a movable piston, carrying means for opening and closing the discharge of the trap in accordance with the movement of the piston. The pressure chamber is advantageously filled with a fluid which compares with the fluid which is being directed through the trap. For example, when the trap is employed as a steam trap, a mixture of water and air is used. The interior of the trap is advantageously constructed so that the incoming steam will blow downwardly over a shielding umbrella into a condensate collecting portion below the position of the cylinder. An increase in condensate within the lower portion of trap causes a cooling of the fluid within the pressure chamber permitting automatic opening of the trap for the discharge of the condensate. When the condensate has been discharged, the higher temperature steam will again cause the control member or piston to move in a direction to close off the discharge of the trap due to the increased temperature of the medium surrounding the pressure chamber.

It should be appreciated that the defects mentioned in the prior art devices under paragraphs (3) and (4) above are substantially eliminated by employing a piston and cylinder having high strength against pressure and shock, and further by the use of an annular ring as a piston ring in accordance with the invention. Such an annular ring may be made of synthetic rubber, synthetic resin or the like having heat and corrosion resistance characteristics, and is provided for sealing the medium within the pressure chamber.

Accordingly, it is an object of the invention to provide an improved steam trap construction. A further object of the invention is to provide a steam trap which includes means within the trap defining a pressure chamber with the fluid therein with the same characteristics as the fluid being directed through the trap, and with a member arranged for movement upon evaporation and condensation of the fluid for closing and opening the trap.

A further object of the invention is to provide an improved steam trap construction which includes a cylinder within the trap mounted over the discharge opening and defining a pressure chamber for a control fluid and with a piston slidable within the cylinder having a valve element for opening and closing the discharge, and wherein the cylinder is located centrally within the valve at a spaced location from the interior wall to define a trap for collecting condensate and including openings to permit the condensate to pass through the trap at a location adjacent the discharge opening in the lower portion of the cylinder.

A further object of the invention is to provide a steam trap which includes a body having a passage defining an inlet extending upwardly from the bottom of the body to an upper filter chamber and with a valve seat defining a discharge opening at the lower portion of the valve body below the filter chamber, and including a cylinder member arranged above the valve seat which includes an upper closed portion defining a pressure chamber, and a piston movable within said cylinder below said pressure chamber carrying a valve element for opening and closing the valve seat, the space between said cylinder and the interior wall of said body defining a condensate collecting area.

A further object of the invention is to provide a steam trap which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 1 is a transverse section of the improved trap construction of the invention;

FIGS. 3, 4, 5 and 6 are enlarged fragmentary sections of the control piston indicating the various cross sectional configurations of the piston ring.

Figure 2:
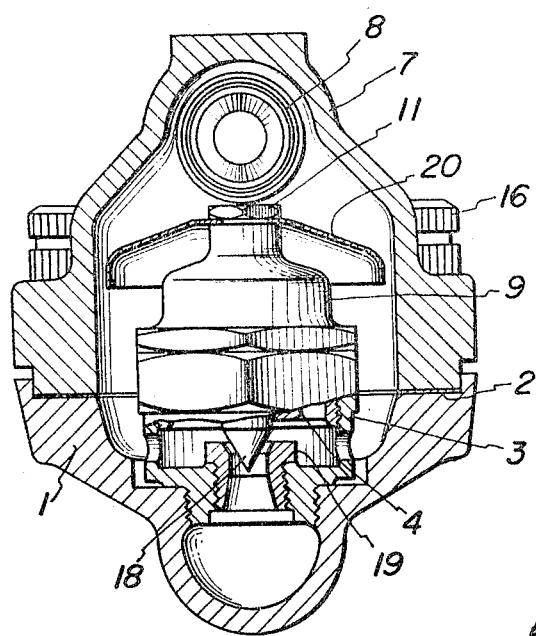
FIG. 2 is a section taken on the line 5—5 of FIG. 1.

In FIGS. 1 to 6 there are indicated an improved construction of a trap generally designated 50 constructed in accordance with the invention. The trap 50 comprises a lower body portion 1 having a threaded inlet A and a threaded discharge H. The lower body portion 1 engages with an upper body portion or cover 7 and the two parts are held together by means of bolts 16. The lower body portion 1 and the upper body portion 7 are provided with connecting inlet passages which comprise a bottom downwardly extending trap and upwardly directing portion B and a rising passage portion C which extends into a filter chamber defined in the cover portion 7 in which is located an annular filter 8.

Flow of incoming steam, for example, is directed through the inlet A, the portion B and the portion C to one end of the filter 8 for flow through the perforations of the filter downwardly into a hollow cylindrical chamber 52. The filter 8 may be removed from one end of the cover portion 7, but it is held in position therein by means of a large size threaded bolt member 13 which, in turn, is interiorly threaded for an access bolt member 14 which is threaded therein. The body member 1 is threaded in the end of a discharge passage 54 to receive the lower externally threaded end of a cylinder holder 3. The lower portion of the cylinder holder 3 is provided with ports F which function as inlets for condensate which collects in a condensate sump portion D of the chamber 52.

A valve seat member 19 is threaded into the interior lower end of the cylinder holder 3 and it is hollow to provide for a through discharge from the chamber 52 to the discharge H.

In accordance with the invention, a cylinder member 9 is threaded into the cylinder holder 3 and it is provided with an upstanding central neck portion over which is an umbrella or shield member 20. The shield member 20 is held in position by means of a threaded bolt member which is threaded into the central hollow portion of the cylinder member 9. An O-ring 10 is provided to insure a tight seal within the interior of the cylinder 9 at the location of the pressure chamber $P_1$. A piston 6 is slidable within the cylinder 9, and it carries a threaded nut member at its lower end which holds a valve element or pin 18 which is adapted to engage on the valve seat 19 for closing the discharge G thereof. The piston 6 is provided with a plurality of annular indented areas 56, at least some of which carry a ring member 5.

In accordance with a feature of the invention, the pressure chamber $P_1$ is filled up with the same medium as exists outside of the pressure chamber, or with a mixture such as the medium being circulated along with air or similar fluid, and the chamber is closed up tightly with the plug 11. Condensate which passes through the filter 8 will be deflected by the shield 20 and will drop downwardly to the condensate sump D.

When steam is first passed through the inlet A, it goes downwardly around the portion B and then upwardly to the passage C and into the filter 8. At this moment the temperature inside the trap is relatively low so that the pressure of the mixture within the pressure chamber $P_1$ is also low and the piston is raised by the vapor pressure outside the pressure chamber $P_1$. This causes the opening of the discharge valve and thus the condensate and air in the condensate sump will flow from the inlet port F through the valve port G to the discharge port H.

When the discharge of the condensate is completed and when any remaining portion is changed to steam, the medium within the pressure chamber is heated by the steam surrounding the chamber and is evaporated and expended until its pressure becomes equal to the saturation pressure of the steam on the outside. This causes the piston 6 to be lowered and move the valve element 18 onto the valve seat 19 and to close the port G so that no additional fluid flows through the discarge H. Such a position is indicated in FIG. 4. When the condensate in the sump D collects to an amount sufficient to cool the pressure chamber, then the medium within the chamber is condensed to a lower pressure. This causes the raising of the piston 6 and the opening of the discharge valve 18 to discharge the condensate. After the completion of the discharge of the condensate, the valve will be closed again by the heating of the pressure chamber due to the increased steam flow therein. In this manner, the device automatically operates to cause opening of the trap and discharge of the condensate when the condensate collects to an amount at which discharge would be desirable.

Figure 5:
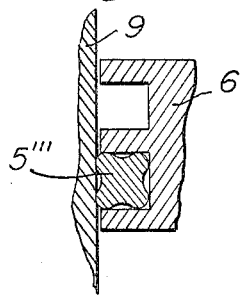
Figure 6:
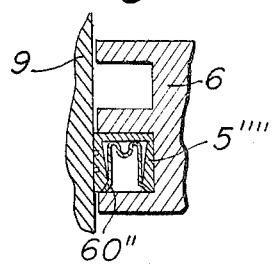

In FIGS. 3 to 6 there are indicated various embodiments of annular seals or signs which are employed and which are similar to the ring 5 indicated in FIG. 1. In FIG. 3, a ring 5' is subjected to tension by means of a metal inner ring 60. In FIG. 4, a rectangular cross section ring 5'' is employed in conjunction with an inner metal tensioning element 60'. In FIG. 5, a substantially X-sectioned ring 5''' is indicated, and in FIG. 6, a piston-shaped ring 5'''' is shown with an inner substantially U-shaped metal tensioning ring 60'' disposed within the hollowed out portion of the piston.

A trap constructed in accordance with the invention has the principal advantage that it is quite sensitive, and hence control will be rapid. When employing a medium of the same quality as that which is circulated around the location of the control medium, there will be some pressure difference between the interior and the exterior of the pressure chamber, no matter how small the temperature difference. The trap will be actuated only when any pressure corresponding to the back pressure imposed on the discharge valve is produced, and there is no limiting temperature range of operation as was the case where other fluids were employed in the prior art devices.

In the design of a steam trap, the size of the valve port is determined by the given capacity of flow. The diameter of the piston for the valve ports is made smaller in the case of a thermo-sensitive medium which is the same as the medium being circulated than in the case of a different thermo-sensitive medium. Thus, with the present invention, the trap size can be made smaller.

When a trap is in a closed condition, the condensate will flow therein, while the outside temperature is constant. The temperature of the condensate will gradually drop lower than the temperature of the pressure chamber, so that the pressure in the chamber will drop. The following formula will be obtained at the moment of valve closing:

$$P_1 A = P_0 (A - B)$$

wherein $A$ = cross sectional area of piston
$B$ = cross sectional area of valve port $P_0$ = pressure on outside of the piston (pressure of steam)
$P_1$ = pressure within the pressure chamber and, in this case, the valve port is open in air and $P_0$, $P_1$ are gauge pressures. Then $$A = \frac{B}{1 - \frac{P_1}{P_0}}$$

When steam pressure $P_0$ and area of valve port B are given, by determining pressure of the pressure chamber, then the cross sectional area of piston A will be determined. In the case of a different thermo-sensitive medium, a larger temperature drop is required compared with the case of the same thermo-sensitive medium, to obtain pressure $P_1$ which is lower than $P_0$. Thus, it is inevitable that the trap is insensitive. To prevent this disadvantage, in case of a different thermo-sensitive medium, it is desirable that the trap operate with the smallest possible pressure difference, i.e., with pressure $P_1$ being as near as possible to the pressure $P_0$. However, for that purpose, the cross sectional area of piston A must be made considerably large, so that the trap becomes larger in size for a given capacity.

With the present invention, where the same thermo-sensitive medium is employed, the temperature difference for a predetermined pressure drop is small. Thus, sufficient pressure may be obtained even if the cross sectional area of the piston is made very small. It is possible to make a trap of a much smaller size for any given capacity than was possible with prior art teachings.

Since the thermo-sensitive medium inside the pressure chamber of the present invention is made of the same fluid as the outside thereof, there is no consumption of this medium. There is also no problem of maintaining the separation of the two media and, if any leakage occurs, there will be no contamination.

In a steam consuming apparatus when the steam pressure is rising, large quantities of high temperature condensate will temporarily be generated. Therefore, this condensate must be discharged as quickly as possible. In the trap according to the present invention, the pressure in the pressure chamber will become negative before the temperature drop of the condensate by the pressure increase of the steam outside the chamber, so that the valve will be opened immediately for discharging the condensate, thus obtaining a rapid discharge of the condensate. When a steam working apparatus is started by introducing steam, the pressure within the pressure chamber becomes negative in respect to the rising pressure of steam on the inlet side, and the discharge valve is continuously open to continuously discharge cool water and air, etc. In addition, if the steam does not completely reach inside the trap, the medium within the pressure chamber will not be heated up to saturation temperature of the steam on the outside. Therefore, the pressure of the pressure chamber will not reach the steam pressure of the outside, so that the valve will not be closed and air and water, etc., which is in the apparatus, will be completely discharged. Thus, the time in which the apparatus attains the required heating temperatures is considerably shortened, so that there is no need for blow-off by means of by-pass valves and the like provided in addition to the steam trap. In the normal operation of the trap of the invention, as air mixed with steam flows into the trap, the temperature of the mixed steam is naturally lower than the saturation temperature of the pure steam. The steam in the pressure chamber is cooled to lower the pressure and the valve is opened and the air discharged. In this way, at the beginning of operation and during normal operation, the discharge of air is easily performed without any fear of air locking.

Since the same medium as the working fluid is used as the thermo-sensitive medium, the pressure differences between the inside and outside during operation is small, and leakage loss is also small. Even if there is some leakage, no damage is caused to the trap or to the apparatus on which the trap is provided.

By employing a pressure chamber which is formed by a strong cylindrical member, the mechanical strength of which is greater than the bellows and diaphragm-type construction, a stronger apparatus results. Since the pressure difference between the inside and the outside of the chamber is also very small, the thickness of the cylinder wall may be made relatively thin, permitting rapid heat transfer therethrough.

The movable parts of the trap of the present invention are the piston with the valve elements and the construction thereof is very simple and the operation of the parts is not subject to fatigue failure. In addition, it is very simple to overhaul the trap and to remove and clean the parts, if necessary. Since the same medium as the operative medium is employed, it is a simple matter to charge the pressure chamber whenever required. In addition, no sealing or solder is required. Since the trap may be made relatively small for a large capacity, it is relatively inexpensive. The opening and closing of the discharge valve is effected rapidly and without any shocking and disagreeable sound.

Basically the invention contemplates a thermo-synchronous control medium for influencing the control of the discharge opening of the trap. The term "thermo-synchronous" as used in the specification particularly refers to a change in pressure on a small scale in proportion to a synchronous change of the temperature difference between the inside and the outside of the pressure chamber. Since the thickness of the cylinder defining the pressure chamber may be made very small because of the small differences of pressure between the interior and the exterior of the cylinder, the heat exchange will be rapid and the inside temperature of the pressure chamber will always follow the outside temperature without delay. In this respect the trap is thermo-synchronous.

In a state when the discharge valve is open, inside pressure of the pressure chamber is equal to the outside pressure. When the outside pressure and temperature are raised, the inside pressure and temperature will be raised at the same pace with the pressure at the outside and the valve will be closed when predetermined temperature and pressure are obtained. The inside pressure of the pressure chamber will be rising while keeping an equilibrium with the outside pressure, and this is a pressure-synchronous operation of the apparatus of the present invention.

Thus, the trap of the present invention operates thermo-synchronously as well as pressure-synchronously. Consequently, the lower temperature of the condensate, the larger the opening of the discharge valve, and in case the temperature of the condensate is relatively high, the opening of the discharge valve is small. Thus, the water is discharged rapidly when the load is large and slowly when the load is small. Thus, the trap is very ideal in these respects.

While specific embodiments of the invention have been shown and described in detail to illustrate the principles of the invention and the application thereof, it will be understood that the invention may be embodied otherwise without departing from such principles.

What is claimed is:

1. A steam trap comprising a body having an elongated inlet passage defined therein extending from the lower portion thereof to the top thereof, a filter cavity defined within said body adjacent the top end of said inlet passage for permitting flow from said passage into the filter, said filter being perforated to permit downward flow of fluid and condensate therefrom, said body defining a central condensate chamber below said filter, means defining a valve seat adjacent the lower portion of said condensate chamber and a discharge for condensate, a cylinder surrounding said valve seat and disposed below said filter, a piston slidable in said cylinder and a fluid between said piston and the adjacent end of said cylinder of the same characteristics as the operating fluid for moving said piston upwardly and downwardly, said piston having a valve element adapted to engage in said valve seat upon downward movement for closing the discharge and to be moved upwardly out of engagement with said valve seat for opening said discharge in accordance with expansion and contraction of the fluid in said pressure chamber.

2. A steam trap according to claim 1, including an annular recess defined in said piston, and a ring disposed in said piston sealing said piston to the walls of said cylinder.

3. A steam trap according to claim 2, wherein said ring is substantially circular sectioned.

4. A steam trap according to claim 2, wherein said ring is substantially X-shaped cross section.

5. A steam trap according to claim 2, wherein said ring is of substantially U-shaped cross section.

6. A steam trap according to claim 2, wherein said ring is biased outwardly by an annular metal element.

References Cited by the Examiner

UNITED STATES PATENTS

| | | | |
|---|---|---|---|
| 336,628 | 2/1886 | Curtis | 236—58 |
| 842,250 | 1/1907 | Sandvoss | 236—56 |
| 1,656,392 | 1/1928 | Russell et al. | 236—59 |
| 1,797,258 | 3/1931 | Grosthwait et al. | 236—58 |
| 1,816,142 | 7/1931 | Clifford | 236—56 |
| 2,022,722 | 12/1935 | Hyatt | 236—56 |
| 2,095,358 | 10/1937 | Dube | 236—34 |
| 2,749,046 | 6/1956 | Schmitz | 236—59 |
| 2,841,429 | 7/1958 | McCuistion | 277—209 |
| 2,898,134 | 8/1959 | Moskow | 277—188 |
| 3,042,363 | 7/1962 | Deeks | 236—59 X |
| 3,091,120 | 5/1963 | Kounovsky et al. | 73—368.2 |

FOREIGN PATENTS 503,596   7/1930   Germany.

ALDEN D. STEWART, *Primary Examiner.*

WILLIAM F. O'DEA, *Examiner.*